United States Patent [19]

McGill

[11] Patent Number: 4,613,048

[45] Date of Patent: Sep. 23, 1986

[54] AUTOMOTIVE CONSOLE BEVERAGE CONTAINER SUPPORT

[76] Inventor: Dennis E. McGill, P.O. Box 178, Sulphur, Okla. 73086

[21] Appl. No.: 733,021

[22] Filed: May 13, 1985

[51] Int. Cl.⁴ .............................................. A47F 7/00
[52] U.S. Cl. ...................................... 211/71; 108/44; 297/194
[58] Field of Search .............. 248/310, 311.2; 108/44, 108/25, 26; 297/188, 194

[56] References Cited

U.S. PATENT DOCUMENTS

| | | | |
|---|---|---|---|
| 2,986,438 | 5/1961 | Smathers et al. | 108/26 X |
| 3,690,724 | 9/1972 | Douglas et al. | 297/194 |
| 4,010,696 | 3/1977 | Priesman | 108/44 X |
| 4,087,126 | 5/1978 | Wynn | 108/44 X |
| 4,174,669 | 11/1979 | Lalonde | 108/44 |
| 4,524,701 | 6/1985 | Chappell | 297/188 X |

*Primary Examiner*—Robert W. Gibson, Jr.
*Attorney, Agent, or Firm*—Robert K. Rhea

[57] ABSTRACT

An automotive console overlying a beverage container support includes a pair of upstanding container support well forming walls on a horizontal panel disposed in lateral spaced relation on opposing sides of the position of an emergency brake lever. Brackets, depending from the panel, secure it to the console and an upstanding wall along the forwardly disposed edge of the panel in combination with the well forming walls and a wall connecting ridge, form an upwardly open coin and small article receptacle.

2 Claims, 7 Drawing Figures

AUTOMOTIVE CONSOLE BEVERAGE CONTAINER SUPPORT

BACKGROUND OF THE INVENTION

1. Field of the Invention

The present invention relates to automotive accessories and more particularly to an article supporting tray device adapted to overlie the drive shaft covering console between the front seats of certain automobiles.

Many motorists enjoy consuming soft drinks and/or coffee while traveling and prefer to have a tray, or the like, adapted for supporting the receptacle containing the drink. This invention provides such a device.

2. Description of the Prior Art

Prior patents generally disclose tray and article supporting apparatus having a convex base adapted to straddle the transmission covering floor hump extending longitudinally of an automotive vehicle.

Some of the prior art devices are adjustable, that is, may be spread or narrowed to fit the particular automotive floor hump while others are made from flexible material which contiguously contacts the upper surface of the floor hump. The upward portion of these prior art trays are some times provided with a generally horizontal top wall spaced above the floor hump spanning base and provided with two or more apertures for supporting drinking glasses, cans, or the like. However, none of these prior art devices, so far as I know, are capable of being inserted between the front seats to transversely overlie and be secured to the console overlying the vehicle drive shaft of automobiles in which a console extends rearwardly of a floor mounted manually operated gear shift transmission principally for the reason, it is believed, there is insufficient space between the forward end portion of the console overlying emergency brake lever and the upper surface of the console.

SUMMARY OF THE INVENTION

A generally planar base panel transversely overlies the console of an automotive vehicle between the front passenger and driver seats. A pair of relatively short legs are secured to and depend from respective end portions of the base panel for attachment with respective side surfaces of the vehicle console. Each end portion of the base panel is provided with an integral generally circular upstanding wall of sufficient height to normally support a drink container during starts and stops of the vehicle. The cup well forming circular wall is characterized by a generally rearwardly disposed vertical slot to accommodate the handle of a coffee cup or mug. The cup wells are further provided with a removable annular ring freely received by the respective cup well and substantially equal with the height thereof to reduce the respective well diameter and maintain a soft drink can therein against typing or spilling its contents.

A reinforcing ridge extends between and is connected with the lower limit of the walls of the cup wells above the surface of the base panel and below the lower limit of a generally horizontal emergency brake lever, not shown. The forwardly disposed edge of the base panel is provided with an upstanding wall, of less height than the wall of the cup wells, which cooperates with the reinforcing ridge and cup well walls to form a receptacle for coins and other small articles.

The principal object of this invention is to provide a novel and improved drink supporting tray adapted to transversely overlie the transmission covering console between the front passenger and driver seats in which cylindrical and handle equipped beverage containers may be supported without tipping, spilling or interfering with normal operation of the manual floor mounted gear shift and emergency brake lever of an automotive vehicle.

DESCRIPTION OF THE PREFERRED EMBODIMENTS

Figure 1:
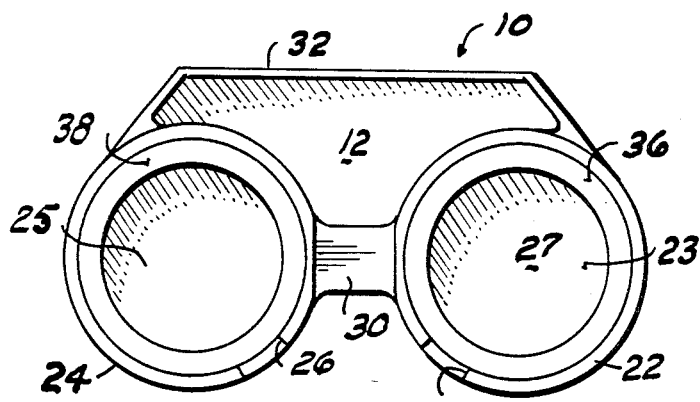
FIG. 1 is top view of the device.
Figure 2:
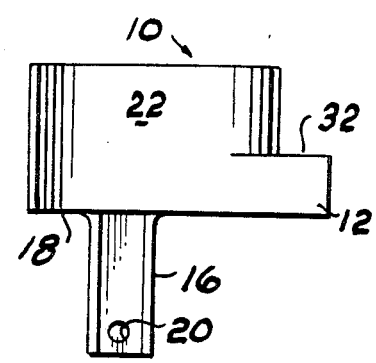
FIG. 2 is a right end elevational view.
Figure 4:
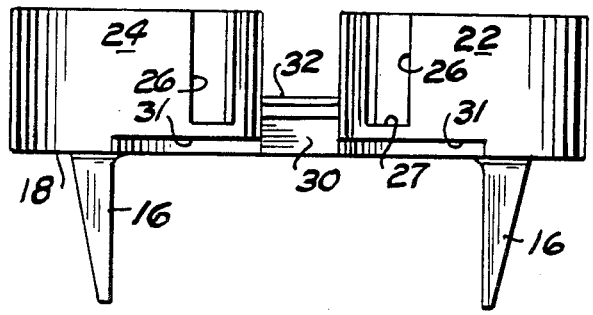
FIG. 4 is a rear elevational view.
Figure 3:
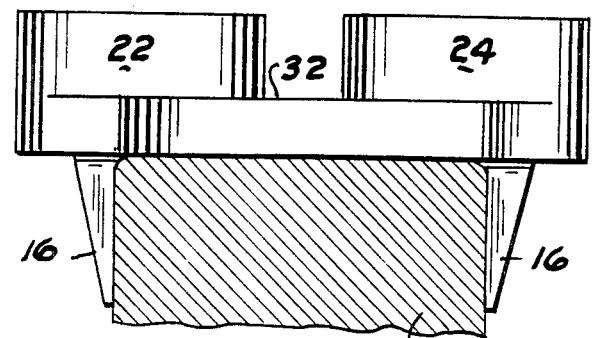
FIG. 3 is a front elevational view with a fragment of an automotive shown in cross section.
Figure 5:
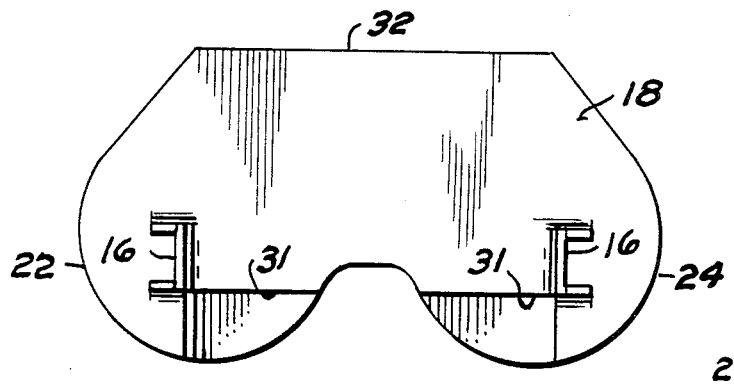
FIG. 5 is a bottom view.
Figure 6:
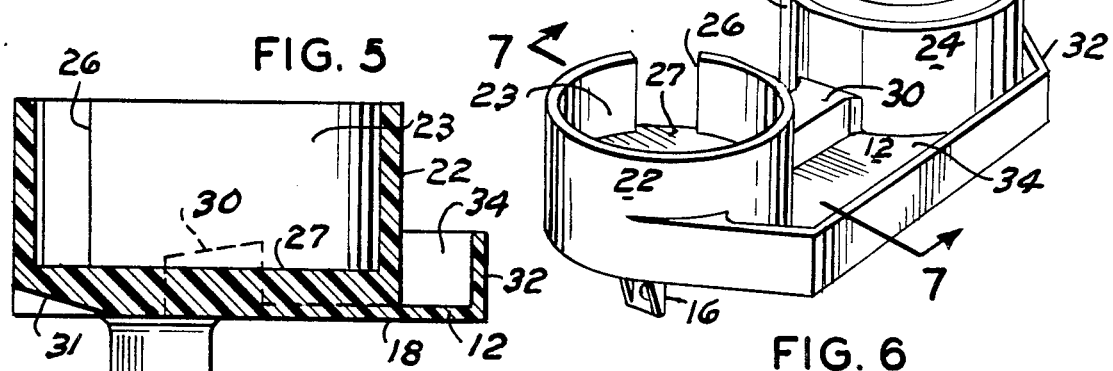
FIG. 6 is a perspective view with one soft drink can holding insert removed; and, FIG. 7 is a vertical cross sectional view, to a different scale, taken substantially along the line 7—7 of FIG. 6.
Figure 7:
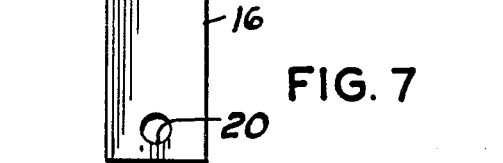

Like characters of reference designate like parts in those figures of the drawings in which they occur.

In the drawings:

The reference numeral 10 indicates the device, as a whole, which includes a base panel 12 which extends transversely in overlying relation on an automotive console 14.

A pair of brackets or legs 16 depend from the flat bottom surface 18 of the base panel and are each provided adjacent their respective depending end with an aperture for receiving a screw 20 to secure the base panel to the console 14. The length of the base panel 12 is slightly greater than the transverse width of the console 14 but less than the space between an automotive front passenger and driver seats, not shown. The respective end portion of the base panel is thickened a dimension at least twice the thickness of the base panel 12, to add rigidity to the unit. These thickened end portions are integrally connected with a pair of part circular upstanding walls 22 and 24, respectively, of a selected height substantially less than the vertical height of a coffee cup, mug or soft drink can, not shown. The spacing between the walls 22 and 24 freely receives the forward end portion of a vehicle emergency brake lever, not shown. The walls 22 and 24 respectively form a pair of drink container support wells 23 and 25 and are characterized by a generally rearwardly disposed slot or spacing 26 extending the full height of the respective wall above the upper surface 27 of the thickened end portions. The purpose of the slot 26 is to loosely nest the handle of a coffee cup or mug when placed in the respective well.

An integral reinforcing lug or ridge 30 spans the spacing between the lower portion of the coffee cup well forming walls and is integrally connected therewith. The height of the ridge 30 is only slightly greater than the upper limit of the thickened end surfaces 27 and underlies the forward end of the emergency brake lever, not shown. That portion of the base panel rearwardly of the ridge and between the wells is removed. A portion of the rearward bottom surface of each panel thickened portion is cut away to describe a rearward and upward angled surface 31 for cooperative contact with a companion surface, not shown, of the console.

The forwardly directed edges of the base panel 12 integrally supports a relatively thin upstanding wall 32 substantially equal in height with the ridge 30 which, in combination with the ridge 30 and coffee cup walls, forms a coin and small article containing receptacle 34.

The coffee cup wells are further provided with removable inserts 36 and 38, each comprising a cylindrical ring or sleeve of desired wall thickness having a length at least equal to the height of the respective coffee cup wall 22 and 24. The sleeves 36 and 38 are characterized by an outside diameter freely received by the inner wall surface of the respective well and having an inside diameter freely receiving a soft drink container can or drinking glass, not shown. These sleeves 36 and 38 are preferably formed from resilient material, such as foam rubber, or the like.

Obviously the invention is susceptible to changes or alterations without defeating its practicability. Therefore, I do not wish to be confined to the preferred embodiment shown in the drawings and described herein.

I claim:

1. A beverage container support, comprising:

an elongated horizontal planar base panel adapted for extending transversely across and flatly contacting an automobile console overlying the automobile drive shaft between the front passenger and drive seats, said base panel having generally circular upstanding portions at its respective ends at least equal in thickness to twice the thickness of the remaining portion of the base panel and having a reinforcing lug substantially square in transverse section and substantially of equal thickness with said thickened portions extending between and interconnecting the latter;

means including a leg normal to and rigidly depending from respective end portions of said base panel on opposite sides of the console for securing the base panel to the console;

an upstanding generally circular cup receiving wall on the respective thickened portion forming beverage container support wells at respective end portions of said base panel, said walls each having a vertical slot for loosely nesting the handle of a cup when disposed within the respective well; and, an elongated upstanding wall substantially equal in height with the thickness of the lug connected with the respective well forming wall and extending along the forwardly disposed edge of said base panel for forming a coin and small article receiving receptacle.

2. The support according to claim 1 and further including:

a sleeve removably received by each said container support well.

* * * * *